(12) United States Patent
Horvatic et al.

(10) Patent No.: US 7,940,954 B2
(45) Date of Patent: May 10, 2011

(54) WATERMARKING DIGITAL REPRESENTATIONS THAT HAVE UNDERGONE LOSSY COMPRESSION

(75) Inventors: Petar Horvatic, Providence, RI (US); Norbert Schiffner, Barrington, RI (US)

(73) Assignee: Fraunhofer Gesellschaft zur Foerderung der Angewandten Forschung E.V., Munich (DE)

( * ) Notice: Subject to any disclaimer, the term of this patent is extended or adjusted under 35 U.S.C. 154(b) by 1050 days.

(21) Appl. No.: 10/536,708

(22) PCT Filed: Nov. 26, 2003

(86) PCT No.: PCT/US03/38151
§ 371 (c)(1),
(2), (4) Date: Oct. 9, 2008

(87) PCT Pub. No.: WO2004/051918
PCT Pub. Date: Jun. 17, 2004

(65) Prior Publication Data
US 2009/0199008 A1 Aug. 6, 2009

Related U.S. Application Data

(60) Provisional application No. 60/429,634, filed on Nov. 27, 2002.

(51) Int. Cl.
*G06K 9/00* (2006.01)
(52) U.S. Cl. ........................................................ 382/100
(58) Field of Classification Search .................. 382/100; 358/3.28; 713/176–179
See application file for complete search history.

(56) References Cited

U.S. PATENT DOCUMENTS

| 5,809,139 | A | 9/1998 | Girod et al. | |
|---|---|---|---|---|
| 6,683,966 | B1 * | 1/2004 | Tian et al. | 382/100 |
| 2002/0154778 | A1 * | 10/2002 | Mihcak et al. | 380/262 |
| 2004/0252834 | A1 * | 12/2004 | Nishimura et al. | 380/201 |
| 2005/0135656 | A1 * | 6/2005 | Alattar et al. | 382/100 |

OTHER PUBLICATIONS

Fridrich et al. ("Lossless data embedding—New paradigm in digital watermarking", EURASIP J. Applied Signal Processing, 2002:2, pp. 185-196).*

(Continued)

*Primary Examiner* — Yubin Hung
(74) *Attorney, Agent, or Firm* — Michael A. Glenn; Glenn Patent Group (57) ABSTRACT

Techniques for watermarking digital representations such as MPEG audio frames that spread the watermark information across the entire audio frame. The techniques work in conjunction with lossy compression techniques and are compatible with the perception models that are often used with lossy compression techniques. The watermark information is spread by means of transformations between the space/time domain and the frequency domain. When a MPEG audio frame is being watermarked, the compressed audio frame as it is produced by the quantizer is transformed from the frequency domain to the time domain; the time domain transformation is then randomized using a key and the randomized time domain transformation is transformed into the frequency domain. The watermark information is added at a predetermined frequency in the frequency domain transformation and the sequence of transformations is done in reverse order, with the randomization and derandomization serving to distribute the watermark information across the frequency domain representation of the watermarked audio frame.

22 Claims, 8 Drawing Sheets

OTHER PUBLICATIONS

Tio et al. ("Perceptual Audio Data Concealment and Watermarking Scheme Using Direct Frequency Domain Substitution", IEE Proc. Vis. Image Signal Processing, vol. 149, No. 6, Dec. 2002, pp. 335-340).*

Changsheng Zu, Yongwei Zhu, David Dagan Feng, "Digital Audio Watermarking Based-on Multiple-Bit Hopping and Human Auditory System," http:www.acm.org/sigmm/mm2001/ep/xu/ [Nov. 18, 2003].

D. K. Koukopoulos and Y. C. Stamatiou, "A Compressed-Domain Watermarking Algorithm for Mpeg Audio Layer 3," Computer Technology Institute and Patras University, 2001.

Sunil Mohan Adapa, "Useful information embedding in images using watermarks," http://students.iiit.net/~mohan/watermarking.html [Nov. 21, 2003]

Ingermar J. Cox, Joe Kilian, Tom Leighton, and Talal Shamoon, "Secure Spread Spectrum Watermarking for Mulitmedia", (c) NEC Research Institute, Technical Report 95-10.

Munetoshi Iwakiri, Kineo Matsui, "Digital Watermark Scheme for High Quality Audio Data by Spectrum Spreading and Modified Discrete Cosine Transform," IPSJ Jouranl Abstract Vo. 39, No. 09-009 hhtp://www.ipsj.or.jp/members//Journal/Eng/2909/article009.html [Nov. 21, 2003].

Herbert Buchner, "Image and Video Watermarking," Telecommunications Seminar WS 1998.

Frank Hartung, "Multimedia Watermarking Techniques," Proceedings of the IEEE, vol. 87, No. 7, Jul. 1999.

* cited by examiner

WATERMARKING DIGITAL REPRESENTATIONS THAT HAVE UNDERGONE LOSSY COMPRESSION

This application is a 371 of PCT/US03/038151 Nov. 26, 2003 which claims benefit of 60/429,634 Nov. 27, 2002

BACKGROUND OF THE INVENTION

1. Field of the Invention

The invention relates to the watermarking of digital representations generally and more specifically to the watermarking of digital representations that have been made using lossy compression techniques.

2. Description of Related Art

Nowadays, the easiest way to work with pictures or sounds is often to make digital representations of them. Once the digital representation is made, anyone with a computer can copy the digital representation without degradation, can manipulate it, and can use the Internet to send the digital representation virtually instantaneously from anywhere in the world to anywhere in the world.

From the point of view of the owners of the digital representations, there is one problem with all of this: pirates, too, have computers, and they can use them to copy, manipulate, and distribute digital representations as easily as the legitimate owners and users can. If the owners and users of the original digital representations are to be protected against illegal copiers or forgers of the digital representations, the digital representations themselves must be protected from pirates and forgers.

One technique that is widely used to make piracy and forgery more difficult is digital watermarking. A digital watermark is a modification of a digital representation so that it contains additional information. The modification is done in such a fashion that the additional information takes the form of noise with regard to the content of the original digital representation. If the noise is added in a way that makes the noise imperceptible when the digital representation is played, displayed, or printed the watermark will remain invisible to those who use the digital representation but can be located and read by those who put the additional information into the digital representation. The additional information can be anything the maker of the watermark chooses, but when watermarks are used to make piracy or forgery more difficult, the additional information is typically ownership or copyright information about the digital representation or information that can be used to authenticate the digital representation or the analog representation that results when the digital representation is played, displayed, or printed. For further information about watermarking, see Jian Zhao, "Look, It's Not There", in: *BYTE Magazine*, January, 1997. Detailed discussions of particular techniques for digital watermarking may be found in E. Koch and J. Zhao, "Towards Robust and Hidden Image Copyright Labeling", in: *Proc. Of 1995 IEEE Workshop on Nonlinear Signal and Image Processing*, Jun. 20-22, 1995, in U.S. Pat. No. 5,710,834, Rhoads, Method and Apparatus Responsive to a Code Signal Conveyed through a Graphic Image, issued Jan. 20, 1998, and in U.S. Pat. No. 6,359,985, Koch, et al., Technique for marking binary coded data sets, issued Mar. 19, 2002. For examples of commercial watermarking systems that use the digital watermarking techniques disclosed in the Rhoads patent, see Digimarc Corporation's web site. For an example of how digital watermarking may be used to authenticate analog representations, see U.S. Pat. No. 6,243,480, Jian Zhao, et al., Digital authentication with analog documents, issued Jun. 5, 2001.

One class of digital representations which have posed difficulties for digital watermarking is digital representations made using lossy compression techniques. These compression techniques are termed lossy because they reduce the size of a digital representation of an audio signal or video signal by removing information from the digital representation. The information selected for removal is information that can be removed without unacceptable damage to the analog representation produced from the compressed digital representation. In some lossy compression techniques, models of how humans perceive sound or images are used to select the information to be removed. The effect of lossy compression is thus the reverse of that of watermarking: while watermarking adds information to the digital representation by increasing the amount of imperceptible noise in the digital representation, lossy compression reduces the size of the digital representation by removing information from the digital representation which would be imperceptible or nearly so in the analog representation made from the digital representation. Of course, the preferred place to put a watermark in a digital representation is in that part of the digital representation which is imperceptible in the analog representation, and consequently, removal of any digital watermarks that were present in the digital representation prior to compression is often one of the side effects of lossy compression of the digital representation.

Figure 1:
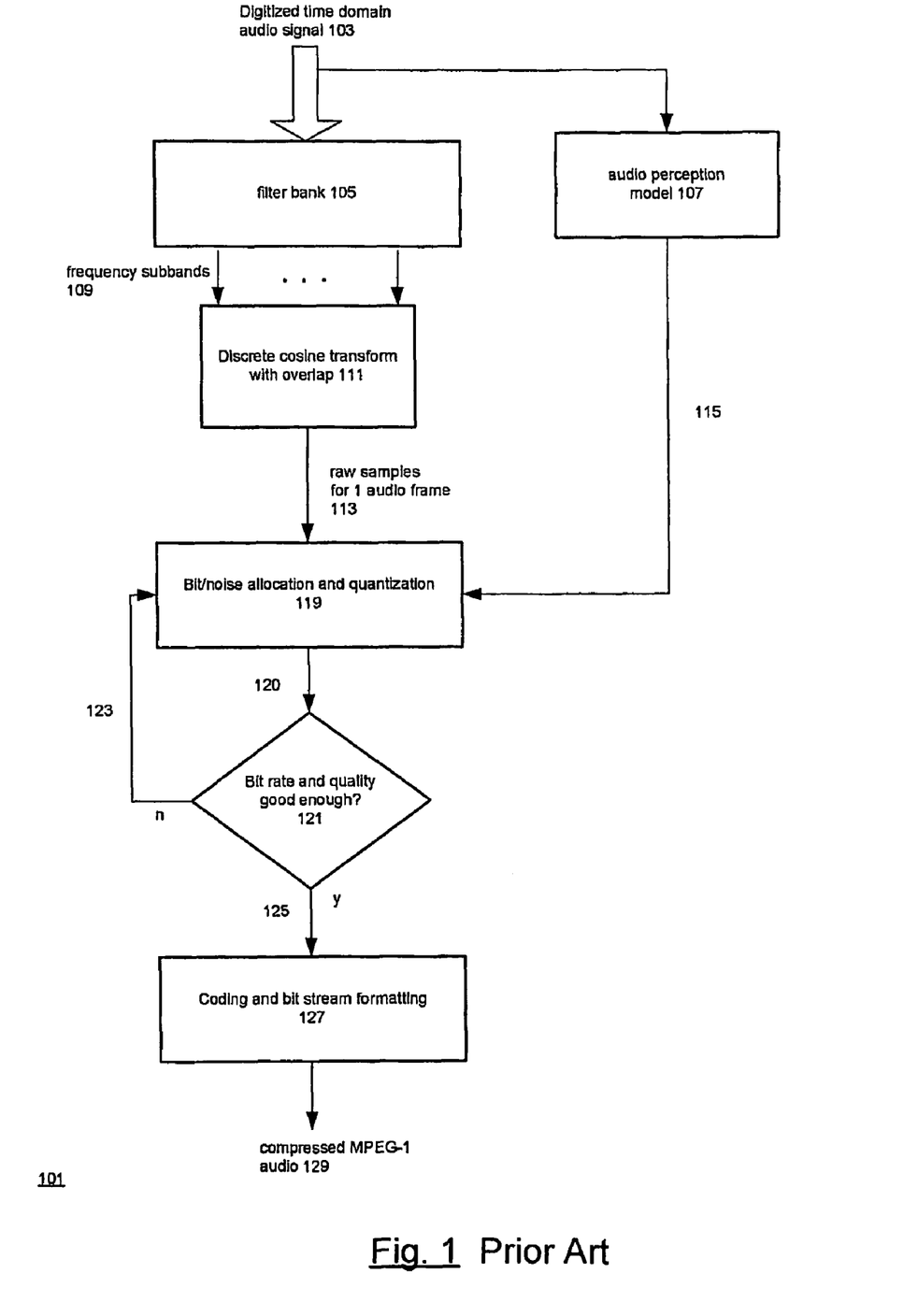
FIG. 1 is a flowchart of the MPEG-1 technique for compressing audio signals.

FIG. 1 shows how lossy compression is applied to an audio signal in the audio compression scheme used in the MPEG 1 standard for producing compressed digital representations of video transmissions or movies. For details, see K. R. Rao and J. J. Hwang, *Techniques and standards for image, video, and audio encoding*, Prentice Hall PTR, Upper Saddle River, N.J. 07548, 1996, pp. 242-265. The input to the compression process is a digitized audio signal 103 in the time domain, i.e., the input is a digitized representation of the audio signal as it varies over time. Audio signal 103 goes to filter bank 105 and also to audio perception model 107. The latter is a model of how the human hearer perceives an audio signal. Filter bank 105 windows the time domain samples 103 into groups of short (6) or long (18) sample windows, depending on spectral and temporal properties of the audio signal, and feeds the grouped samples into Modified Discrete Cosine Transform 111. The output of 111 is a set of frequency samples 113, representing one frame of raw audio in the frequency domain. These samples are now ready to be quantized and grouped into subbands for comparison against 32 signal-to-mask ratios produced by audio perception model 107.

The raw sample 113 is then compressed at 119 by quantizing the raw frequency samples for the frame and applying audio perception model 107 to the quantized raw samples. With the help of audio perception model 107, bit noise allocation and quantization process 119 minimizes the number of bits needed to represent the audio signal contained in the frame while keeping the distortion at minimum. The frame that results from this process is output at 120 to decision block 121, which determines whether the bit rate of the frame is low enough and its quality high enough to meet the standard for the compression process. If the frame passes, it is encoded and formatted at 127 as required for the MPEG-1 audio bit stream 129; if not, loop 123 returns the frame to allocation and quantization stage 110 and the audio perception model is again applied to it.

As is apparent from the above description, MPEG compression 101 will tend to destroy any watermark which has been applied prior to the compression process to digitized time domain audio signal 103 or to a digitized frequency domain audio signal. Moreover, any watermark that is applied during the compression process must take perception masking model 107 into account, since model 107 will result in the elimination of the imperceptible noise that usually carries the watermark. It is thus an object of the invention to provide a technique for watermarking digital representations during a lossy compression process which is compatible with the use of perception model 107 in the compression process.

SUMMARY OF THE INVENTION

The object of the invention is attained by a technique for watermarking digital representations of signals that spreads the watermark information across the entire digital representation of the signal. Since the watermark information is spread across the entire digital representation, no portion of the digital representation is altered enough to cause perceptible distortion to analog outputs made from the digital representation and the watermark information can be applied to a digital representation produced by a lossy compression technique. The spreading is accomplished by making a first reversible transformation of an original digital representation of the signal, adding the watermark information to the first transformation, and reversing the first transformation to produce the watermarked digital representation.

The reversible transformation may involve transformations between the time/space domain and the frequency domain. One version of the reversible transformation takes a first digital representation of a signal that is in a first domain which is either the time/space or frequency domain and proceeds as follows: it transforms the first digital representation into a second digital representation in a second domain which is opposite to the first and then randomizes the second digital representation. The randomized second digital representation is transformed into a third digital representation in the first domain and the watermark information is added to the third digital representation. Then the watermarked third digital representation is transformed in the reverse fashion: the watermarked third digital representation is transformed into a fourth digital representation in the second domain, the fourth digital representation is derandomized, and the derandomized fourth digital representation is transformed into the watermarked digital representation in the first domain. In one version of the technique, randomization and derandomization is done using a key and the watermark information can thus be added or detected only by an entity which is in possession of the key.

Because the watermark information is spread across the watermarked digital representation, the watermark information can be applied to a digital representation that has been made according to a perception model; moreover, the watermarked digital representation can be filtered according to the perception model and if the watermarked digital representation does not conform to a quality and bitrate standard, the perception model can be used to modify the watermarked digital representation so that it does. A further advantage of the technique is that the watermark can be applied at the time the lossy compression is made.

Other aspects of the invention include a technique for detecting watermark information in a digital representation to which the watermark information has been added as described above and a digital representation of a signal that is made using the technique. In the detection technique, the transformation which was used to add the watermark information is repeated on the watermarked digital representation and the digital representation resulting from that transformation is examined for the watermark information.

The fact that the watermarking technique of the invention is compatible with lossy compression methods that employ perceptual models makes it particularly well adapted to watermarking the audio stream of a MPEG multi-media representation.

Other objects and advantages will be apparent to those skilled in the arts to which the invention pertains upon perusal of the following Detailed Description and drawing, wherein:

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present an overview of the general technique employed to add a watermark to a digital representation in the course of a lossy compression of the digital representation and will then describe in detail how the technique may be used to add a watermark to an MPEG-1 audio stream.

Overview of the Technique

With any kind of watermarking of digital representations, bits of watermark information are added to the digital representation in such a way that their presence is imperceptible or nearly so to ordinary users of the digital representation. In general, the more redundant information there is in a digital representation, the easier it is to add watermark information. As already described, the goal of a lossy compression technique is to produce a compressed digital representation of an original digital representation from which all of the redundant information has been removed, leaving only the minimum required to produce a sound or image from the compressed digital representation that to the human user is indistinguishable from that produced from the original digital representation. A consequence of the fact that there is little or no redundant information in the compressed digital representation is that the watermark must be made by slightly changing the values of many components of the compressed digital representation; in technical terms, the watermark information must be spread across the components of the compressed digital representation. When the watermark is read, the information that has thus been spread across the components of the compressed digital representation must be recombined so that there is a clear signal indicating the presence of a "1" or "0" bit of watermark information.

The watermarking technique described herein is used with digital representations of signals. The signals may be audio signals or signals representing either still images or moving images. An audio signal may be represented either in the time domain or the frequency domain. The representation in the time domain shows how the audio signal varies over a given period of time; the representation in the frequency domain shows the audio frequencies that are present in the audio signal over the given period of time. The period of time is called a frame. A signal representing an image has analog representations. The representation that is analogous to the time domain is the space domain representation: the space domain representation shows how the colors that are present in a given region of the image vary across the region. As one would expect, the corresponding frequency domain representation shows what colors are present in the region. Again, the region will be termed a frame. In the following, the domains will be spoken of as the space/time domain, indicating that the domain in question is the time domain with an audio signal or the space domain with an image signal, and the frequency domain, indicating the frequency domain in either case. Of course, a representation of a signal in the space/time domain may be transformed into one in the frequency domain and vice-versa.

Figure 2:
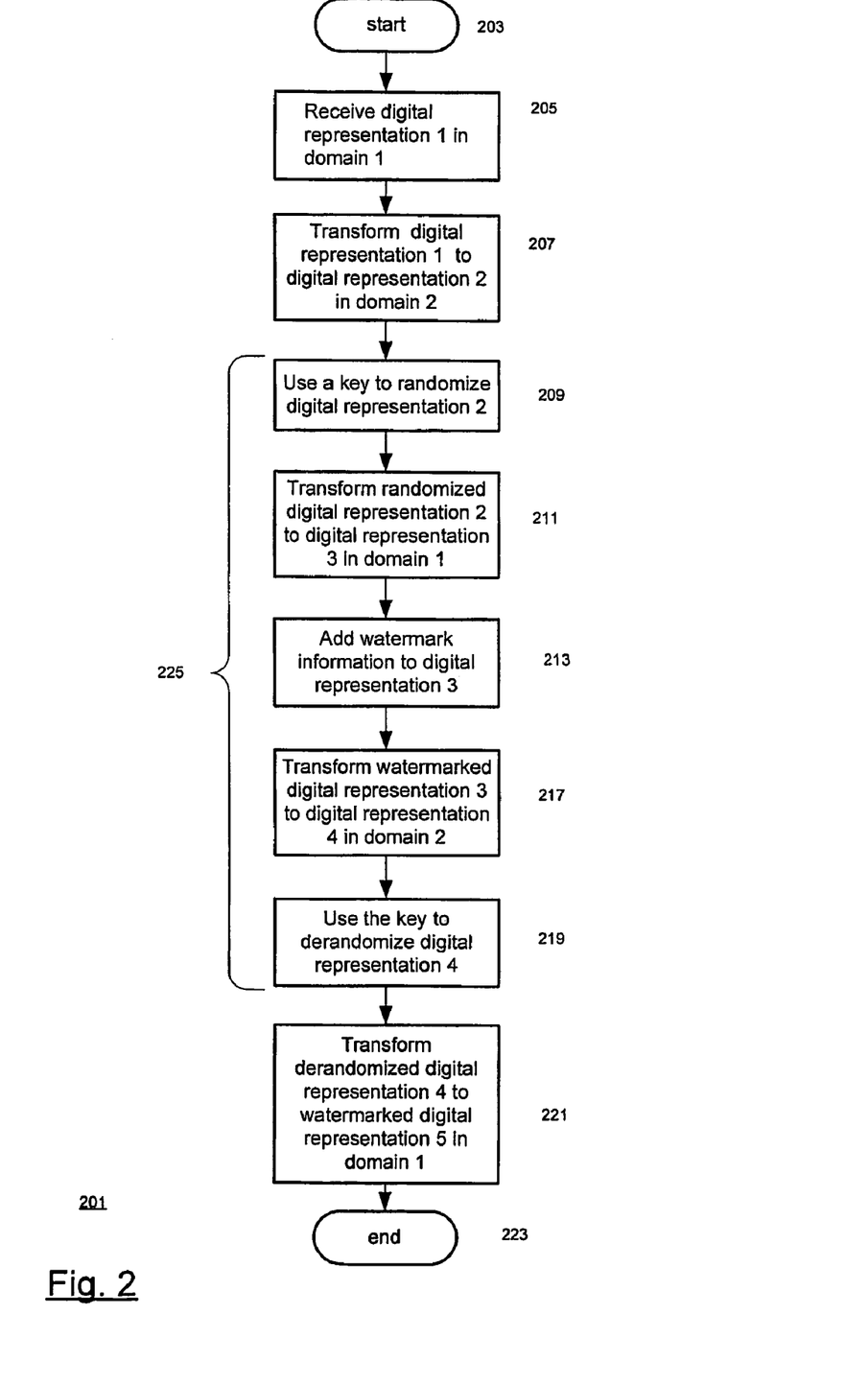
FIG. 2 is a flowchart of a general technique for adding a bit of a watermark to a digital representation in the course of a lossy compression of the digital representation.

Adding the Watermark to the Compressed Digital Representation: FIG. 2

The compressed digital representations upon which the watermarking technique is employed are either in the time/space domain or the frequency domain. The watermark information is spread across the compressed digital representation by the method shown in flowchart 201 of FIG. 2. The compressed digital representation to which the watermark information is to be applied is digital representation 1, which belongs to domain 1 (205), which may be the space/time or frequency domain. Digital representation 1 is transformed into digital representation 2, which is in domain 2 (207). Domain 2 is the opposite domain from domain 1; thus if domain 1 is space/time, domain 2 is frequency. Digital representation 2 is then randomized (209). One way of doing this is to use a key, and the key may be known only to the entity doing the watermarking. Randomized digital representation 2 is then transformed into randomized digital representation 3, which is in domain 1 (211).

The watermark information is then added to digital representation 3 in a manner such that the information may be easily perceived in digital representation 3 (213). For example, if digital representation 3 is in the frequency domain, a "1" bit may be added to the representation by greatly increasing the amplitude of a predetermined frequency in the original digital representation 3. A "0" bit would be indicated by leaving original digital representation 3 unchanged. In other embodiments, the reverse can be done or two different predetermined frequencies may be used to indicate a "1" bit and a "0" bit. Next, watermarked digital representation 3 is transformed to digital representation 4 in domain 2 (217) and digital representation 4 is derandomized (219). If a key was used to randomize digital representation 2, the same key is used to derandomize digital representation 4. The effect of the steps indicated by bracket 225 is to spread the added frequency across digital representation 4. When digital representation 4 is transformed into digital representation 5 in domain 1 (221), the result is a version of digital representation 1 which has the watermark information spread across it.

Figure 3:
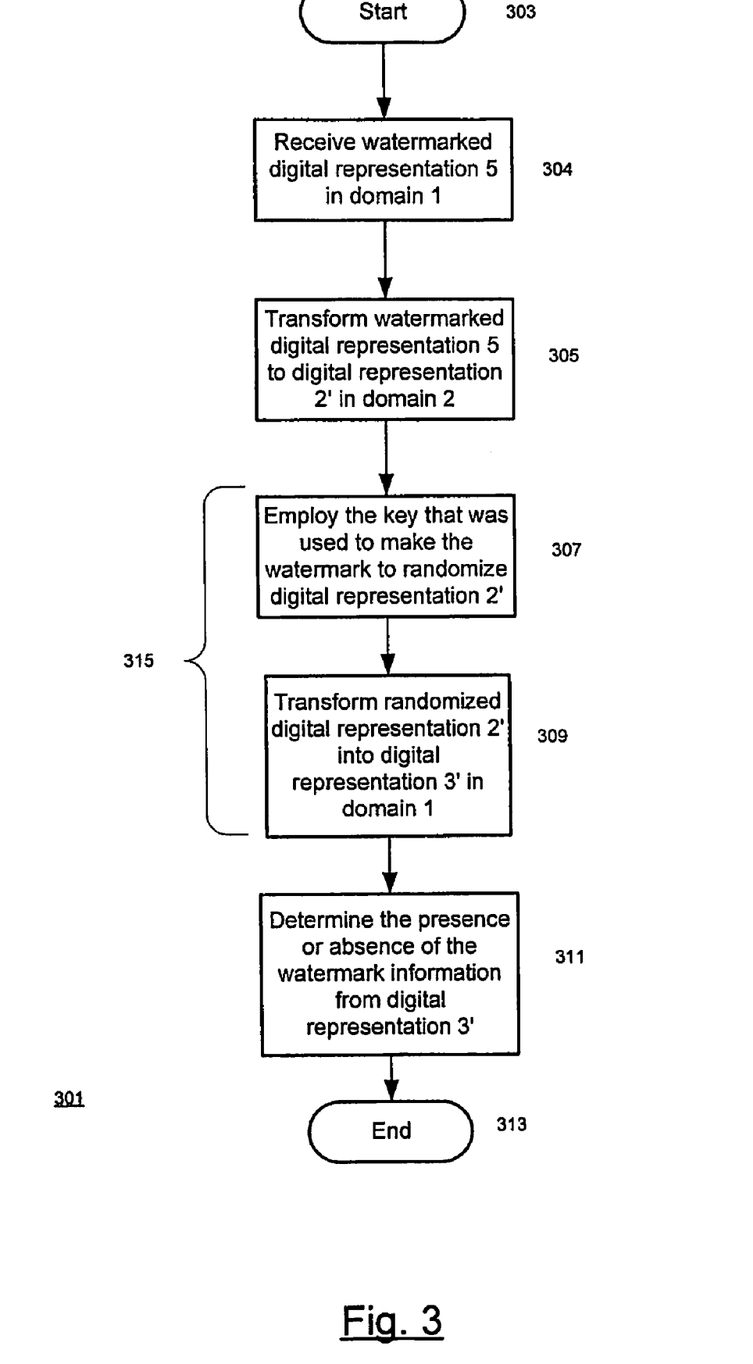
FIG. 3 is a flowchart of a general technique for detecting a bit of a watermark made by the technique of FIG. 2.

Detecting Watermark Information in the Compressed Digital Representation: FIG. 3

Detection is done by repeating the steps of adding the watermark information on watermarked digital representation 5 up to the point where the watermark information is to be added. This procedure recombines any watermark information that was spread across digital representation 5, and if the representation at that point contains the recombined information, the watermark has been detected in watermarked digital representation 5. Flowchart 301 in FIG. 3 describes this process in more detail. Beginning at start 303, a watermarked digital representation 5 belonging to domain 1 is received (304). Representation 5 is transformed into digital representation 2' in opposite domain 2 (305). Since representation 5 contains the watermark information, digital representation 2' is identical to digital representation 2 except that it contains the watermark information. Digital representation 2' is randomized in exactly the same fashion as before (307). If a key was used to make watermarked digital representation 5, the same key must be used to make randomized digital representation 2'. Randomized digital representation 2' is then transformed into digital representation 3' in domain 1 (309). If digital representation 5 contains watermark information, the watermark information can be read from digital representation 3'. The effect of the steps indicated at 315 is to recombine the watermark information that was added to digital representation 3. Thus, if a "1" bit was added to digital representation 3 by increasing the amplitude of a predetermined frequency in that digital representation, the frequency whose amplitude was increased will be visible in digital representation 3'.

Using the Technique to Watermark Audio Signals that have been Compressed Using the MPEG-1 Audio Compression Scheme The following will first show how the technique described above can be used in the context of the MPEG-1 audio compression scheme, will then present a detailed example of watermarking in this context, and will finally show how the watermark may be detected. It should be emphasized here that the technique is not limited to the MPEG-1 audio compression scheme but can be used with any lossy compression technique which produces a representation of a signal in the time/space or frequency domains. Implementation details for the technique will of course depend on the kinds of signals and the compression scheme. For example, lossy compression schemes for audio signals use audio perception models, but there is nothing corresponding to audio perception models for images. Where audio perception models exist, they can be used to increase the quality of the watermarked compressed representation, but how they are used will depend on the perception model and the compression scheme.

Figure 4:
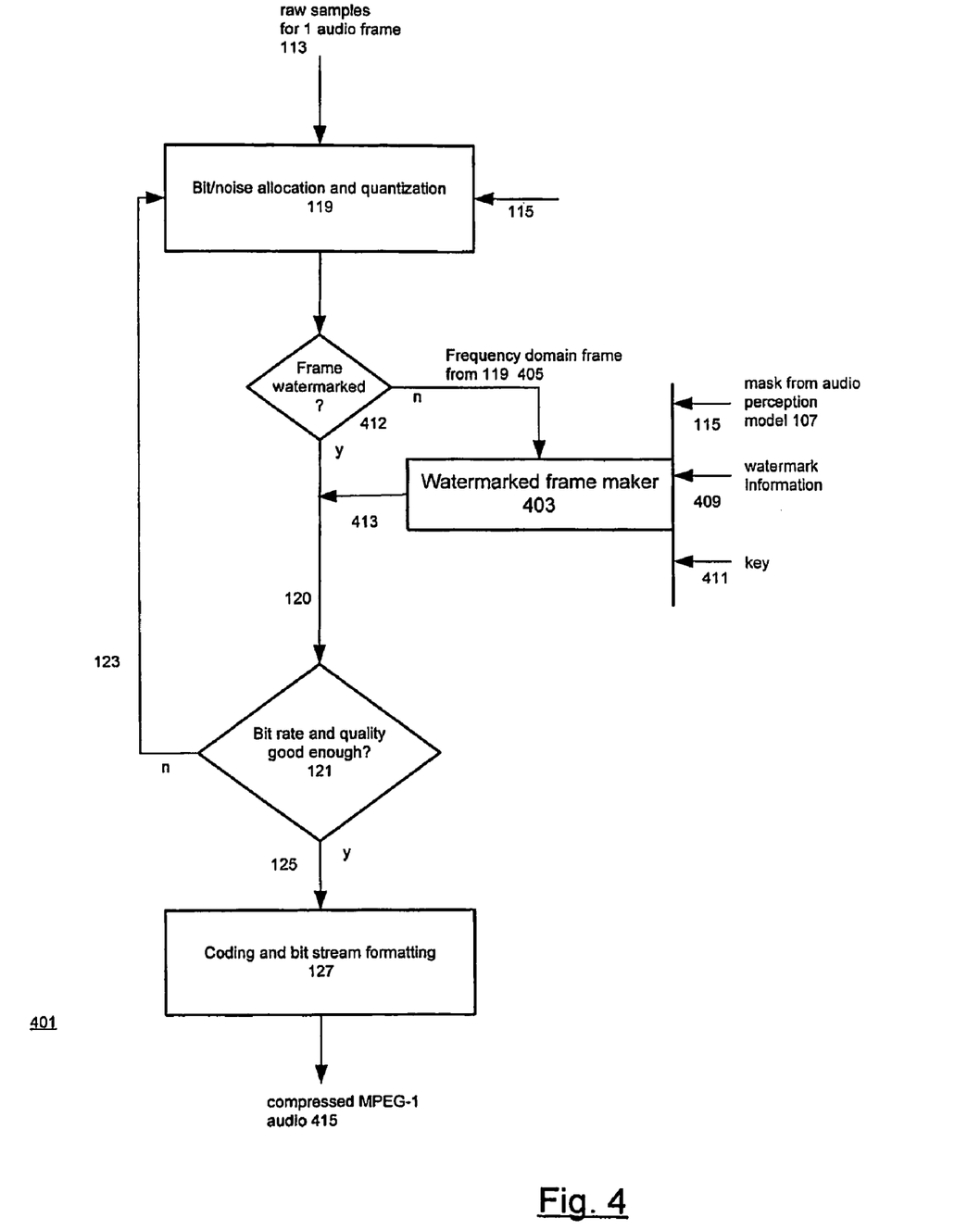
FIG. 4 is a flowchart of the technique of FIG. 2 as applied to MPEG audio signal compression.

The Place of the Technique in the MPEG-1 Audio Compression Scheme: FIG. 4

FIG. 4 shows how the MPEG-1 compression scheme shown in FIG. 1 may be modified to permit watermarking using the technique just described. Components of FIG. 1 which appear in FIG. 4 have the same reference numbers. Watermarking takes place in loop 123. Each time through loop 123, the frame being output by block 119 is checked to determine whether it has been watermarked (block 412); if not, watermarked frame maker 403 adds a bit of watermarking information to the frame as specified by watermark information 409. If the bit is a "1" bit, the information making up the bit is spread across the frame; if it is a "0" bit, the frame remains unchanged. Watermarked frame maker 403 uses key 411 to spread the watermark information across the frame.

The addition of the watermarking information in block 403 disturbs the signal to noise (S/N) ratio of the frame as originally output from block 119, so it may be necessary for watermarked frame 413 to be quantized with an increased scale factor and reshaped. When this is the case, block 121 returns watermarked frame 413 to block 119. The amount of watermark energy which may be embedded for the "1" bit is controlled by adjusting the coefficients of the mask 115 received from audio perception model 107 to allow more noise. In practical watermark embedding applications, not enough noise is introduced to perceptibly degrade the audio quality. After the bitrate and masking thresholds are satisfied for the watermarked frame, the watermarked frame is ready for bitstream formatting and coding at block 127 and is output as part of the MPEG-1 bit stream at 415.

Figure 5:
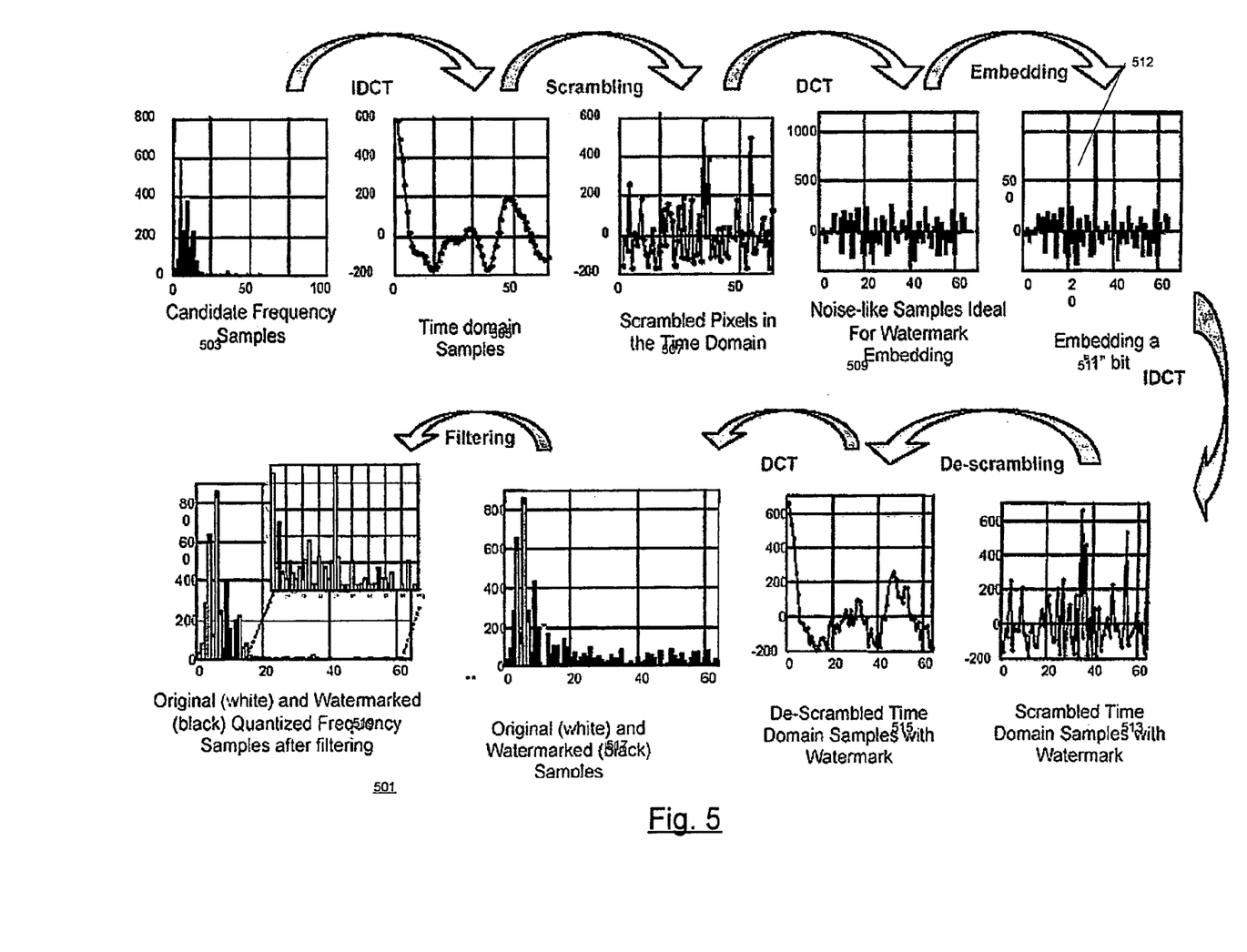
FIG. 5 shows the details of the frames resulting from the technique of FIG. 4.

Details of Making the Watermarked Frame: FIG. 5

FIG. 5 shows at 501 the manner in which watermarked frame maker 403 makes a watermarked frame 413 from the frequency domain frame 405 that frame maker 403 receives from bit/noise allocation and quantization block 119. In the following, the steps shown in FIG. 5 will be related to the steps shown in FIG. 2 of which they are specific embodiments. Beginning at 503, what is shown there is the frame as it is produced by block 119. Frame 503 is in the frequency domain. It is then transformed into time domain frame 505 using the inverse DCT transform (IDCT). (step 207 in FIG. 2). Time domain frame 505 is then scrambled (randomized) using key 411 (step 209) to produced time domain frame 507. Frame 507 is then transformed into frequency domain frame 509 (step 211) using the DCT transform. Frequency domain frame 511 is then produced by adding a "1" bit to the frame (step 213). What is added is a large amount of a predetermined frequency, shown at 512 in frame 511. Frequency domain frame 511 with watermark bit frequency 512 is then transformed into time domain frame 513 (step 217). Time domain frame 513 is randomized because frame 509 was randomized, but it now includes watermark "1" bit 512. Frame 513 is then derandomized using key 411 to produce derandomized time domain frame 515 (step 219), which is frame 505 plus the information for the watermark "1" bit. The effect of the derandomization is to spread the watermark "1" bit across derandomized time domain frame 515. When derandomized time domain frame 515 is then transformed into frequency domain frame 517 (step 221), the watermark "1" bit is similarly spread across the frequencies of frame 517. In frame 517, the parts of frame 517 which were in frame 503 are shown in white; those which were added by the watermark are shown in black.

Although the steps represented by frames 503-517 have added the "1" bit to frame 517, there remains a good possibility that the added bit has introduced significant audible distortion to the frequency spectrum of frame 517. In particular, the difference between the amplitude of the frequencies in original frequency domain frame 503 and the amplitude of the frequencies in watermarked frequency domain frame 517 is constant throughout entire frequency range, depicted on a 0-60 horizontal scale in the frames. This is not in compliance with the spectral shape of the frequencies in frame 503, which taper off to zero in the range 20-60. To eliminate the distortion, a final filtering step is added. In the step, the coefficients that determine the amplitude of the frequencies are filtered or colored to produce the frequencies in frame 519, which conform closer to the original QS shape and have better overall frequency response. In frame 519, frequency range 20-60 is magnified for easier comparison. In the embodiment of FIG. 4, the filtering takes advantage of mask 115 received from audio perception model 107. The filter is formed by normalizing the shape of the frequency samples of frame 503. The shape of the frequency samples was of course determined by mask 115. Normalization is done by dividing the frequency samples of frame 503 as they were determined by mask 115 by the maximum amplitude in the original sample. The filter is applied only to the amplitude differences between frame 503 and watermarked frame 517.

Although the filtering filters out a considerable amount of the watermark energy, the watermark detector needs only to be able to differentiate between the presence and the absence of the amplitude peak for the predetermined frequency that indicates the "1" bit, and while the filtering or coloring reduces the amplitude of that frequency, enough remains for easy detection of whether the frame contains the "1" bit. If there is no "1" bit, the frame represents a "0" bit of the watermark. Watermarked frame maker 403 then outputs filtered frame 519 as frame 413. If frame 413 requires further work, it again passes through bit/noise allocation and quantization block 119, as shown in FIG. 4.

In this approach, nearly completely invertible transformations between the space/time and frequency domains, combined with randomization of the domain that is the opposite of the domain of the frames as input to and output from method 201, are required to achieve good frequency spreading of the watermark energy. Many other domain-based transforms may be used besides to the DCT/IDCT transform pair. We have also achieved successful results with the Walsh transform. The important characteristic of the transform pair used is near perfect invertability, so that error introduced during transformation is minimal.

Advantages of the Approach

The approach described above provides an efficient way of spreading the watermark bit across the representation of the signal in the frame. The fact that the watermark bit has been spread across the representation makes it harder to detect and remove the watermark, particularly when the spreading is done using a secret key. The approach's efficiency comes from the fact that it is integrated into the loop that does the compression and is increased by the fact that it uses the same set of masking coefficients as those employed for compression. The watermark strength is thus tightly coupled to the masking coefficients and varies automatically with the quality and bitrate requirements for the compression process.

Figure 6:
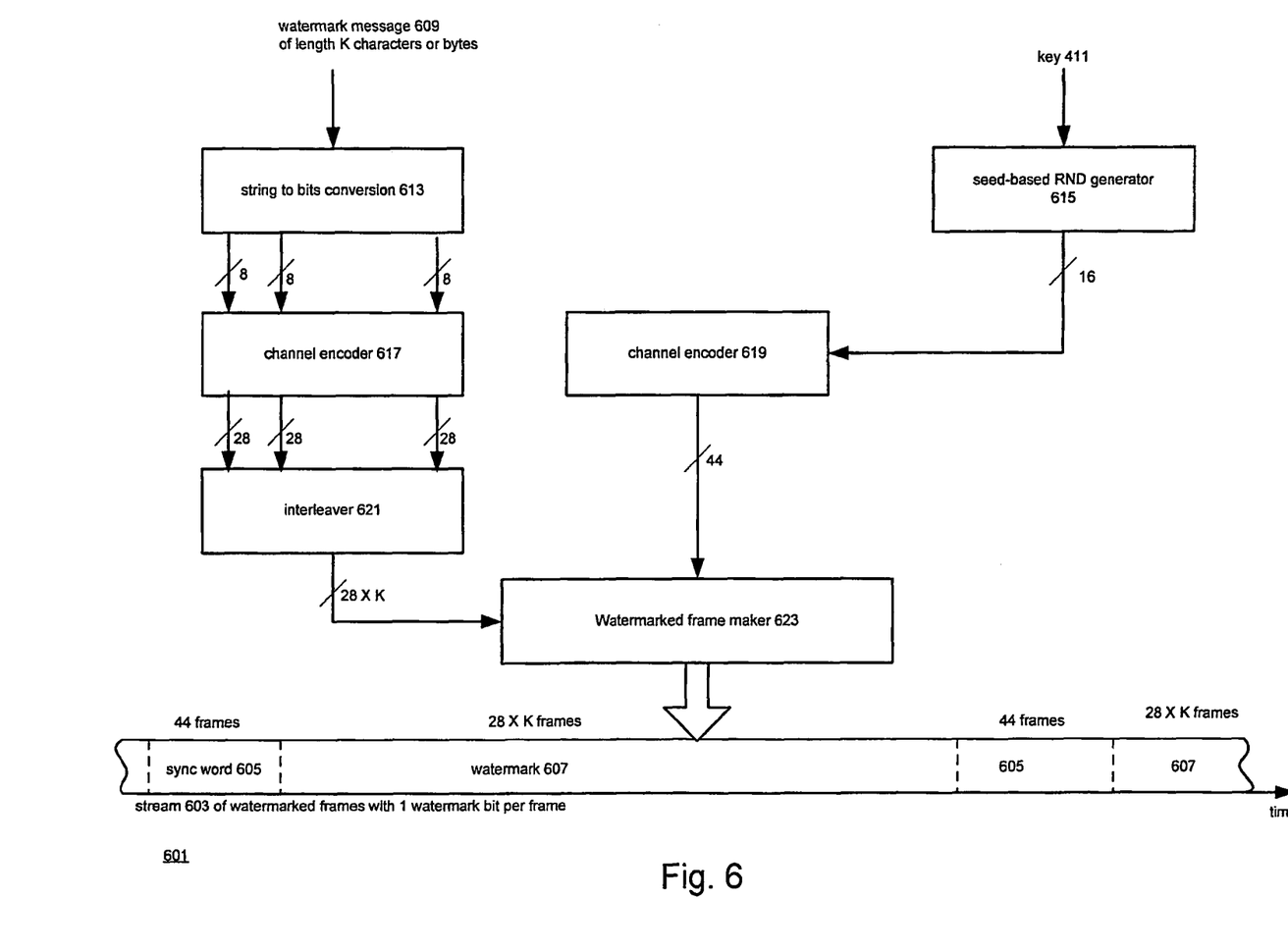
FIG. 6 shows how the bits added to the frames using the technique of FIG. 4 are combined to make sync marks and watermark values.

Adding the Watermark to the Compressed MPEG-1 Audio Stream: FIG. 6

FIG. 6 shows an arrangement 601 for adding watermarks whose bits are inserted into the frames of a MPEG-1 audio stream to the MPEG-1 audio stream. In MPEG audio stream 603 shown there, each frame in the audio stream is marked with a bit either of watermark 607 or of sync word 605. The purpose of sync word 605 is to provide a known recurring pattern which separates watermarks 607. The repeated marking of audio stream 603 is necessary to increase the robustness of watermark 607. The repetition is required because audio or video are non-stationary signals and exhibit drastically changing capacities for accepting bits of watermark information. That is particularly the case when the representations of the signals have undergone lossy compression and where the watermark bit may perceptibly affect the quality of the audio produced from the compressed representation of the signal. Another result of the low capacity of the compressed representation for watermark information is that bit errors when the watermark is detected are common and unpredictable. To reduce such bit errors, the watermarks produced by arrangement 601 include error correction coding. This permits detection and correction of errors made in detecting the watermark bits. Thus, 20 error correction bits are added to each byte of watermark information to make a 28-bit watermark byte word and similarly, 28 error correction bits are added to each 16-bit synchronization value to make a 44 bit synchronization word 605. To further reduce the effect of groups of consecutive detection errors, the watermark bits and ECC bits of each of the K watermark byte words are evenly interleaved in watermark 607.

As shown in FIG. 6, watermark message 609 of length K characters or bytes is input to string to bits conversion block 613. Watermark message 609 may be any sequence of characters or bytes which suits the purposes of the watermarking entity. String to bits conversion block 613 converts the watermark message 609 into a sequence of bytes of data. These bytes go to channel encoder 617, which adds the ECC code. The 28-bit watermark bytes that result go to interleaver 621, which interleaves the bits of the watermark bytes and outputs them to watermarked frame maker 623 as watermark 607. Watermarked. frame maker 623 adds the bits to the frames. Each watermark 607 is preceded by a sync word 605, which is made by using key 411 (which may be any key that suits the purpose, including the same one used to randomize and derandomize the time domain frames) as a seed value in random number generator 615. A random 16 bit value is produced, and this value is used to produce all of the sync words 605. Channel encoder 619 adds the ECC bits for the 44-bit sync word 605 and watermarked frame maker 623 inserts the bits of sync word 605 between the watermarks 607. Together, the 44-bit sync word 605 and watermark 607 make up watermark information 409.

Figure 7:
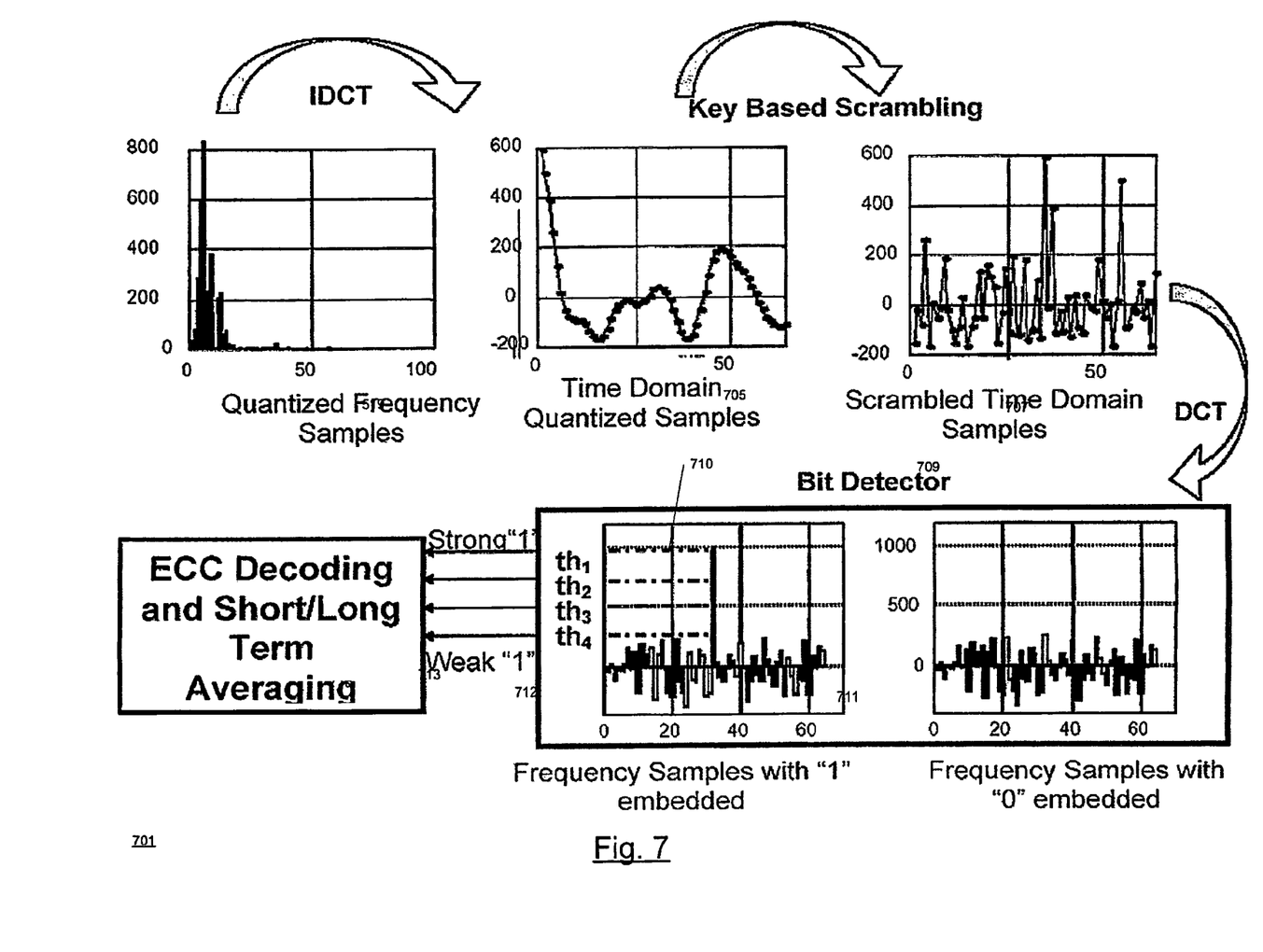
FIG. 7 shows how the watermark is detected in frames made using the technique of FIG. 4.

Detecting the Watermark Information in the Stream of Frames: FIG. 7

FIG. 7 shown below describes watermark detection process 701. In the following, steps of FIG. 7 are related to the steps of FIG. 3 of which they are embodiments. Input to the detector is the watermarked time-domain frame 519 recovered from compressed MPEG audio stream 603 (step 304). Frame 519 is then transformed into time domain frame 705 (step 305) and randomized using key 411 (step 307) to produce randomized time domain frame 707. Frame 707 is then transformed into frequency domain frame 711 (watermark "0" bit) or 712 (watermark "1" bit) via the DCT transform (step 309). Frame 711 or 712 is passed to Bit-Detector 715 to determine whether the frame has a "1" or "0" watermark bit, as indicated by the presence or absence of frequency peak 710 (step 311). Because audio and video signals exhibit constantly changing embedding properties, the amplitude of peak 710 can vary significantly. For this reason 4 thresholds 713 are defined and are used to weight the detected result. As shown by the bit detector a peak value higher than $th_1$ is interpreted as a strong "1" and a weak "0". A peak value below threshold $th_4$ is interpreted as a weak "1" and a strong "0". Values in between are assigned weights according to their values relative to the thresholds.

Decoding and averaging component 715 assumes that the watermark information is repetitive. Decoding and averaging component 715 employs the ECC bits in each successive watermark byte word or sync word 605 to determine the probable value of the watermark byte word or sync word and then average the bits in successive detections of the sync words and watermark byte words to determine the actual sync word and watermark information. If there is a watermark, the average values should eventually converge to single values for the sync value and the watermark information. These values can then be compared with the watermark information used to watermark the stream and the sync value produced by key 411 to determine whether the watermark is the same as the one that was put on stream 603. Time of convergence is dependent on the amount of repetition of the watermark and the amount of processing that stream 603 has been subjected to since it was watermarked.

Figure 8:
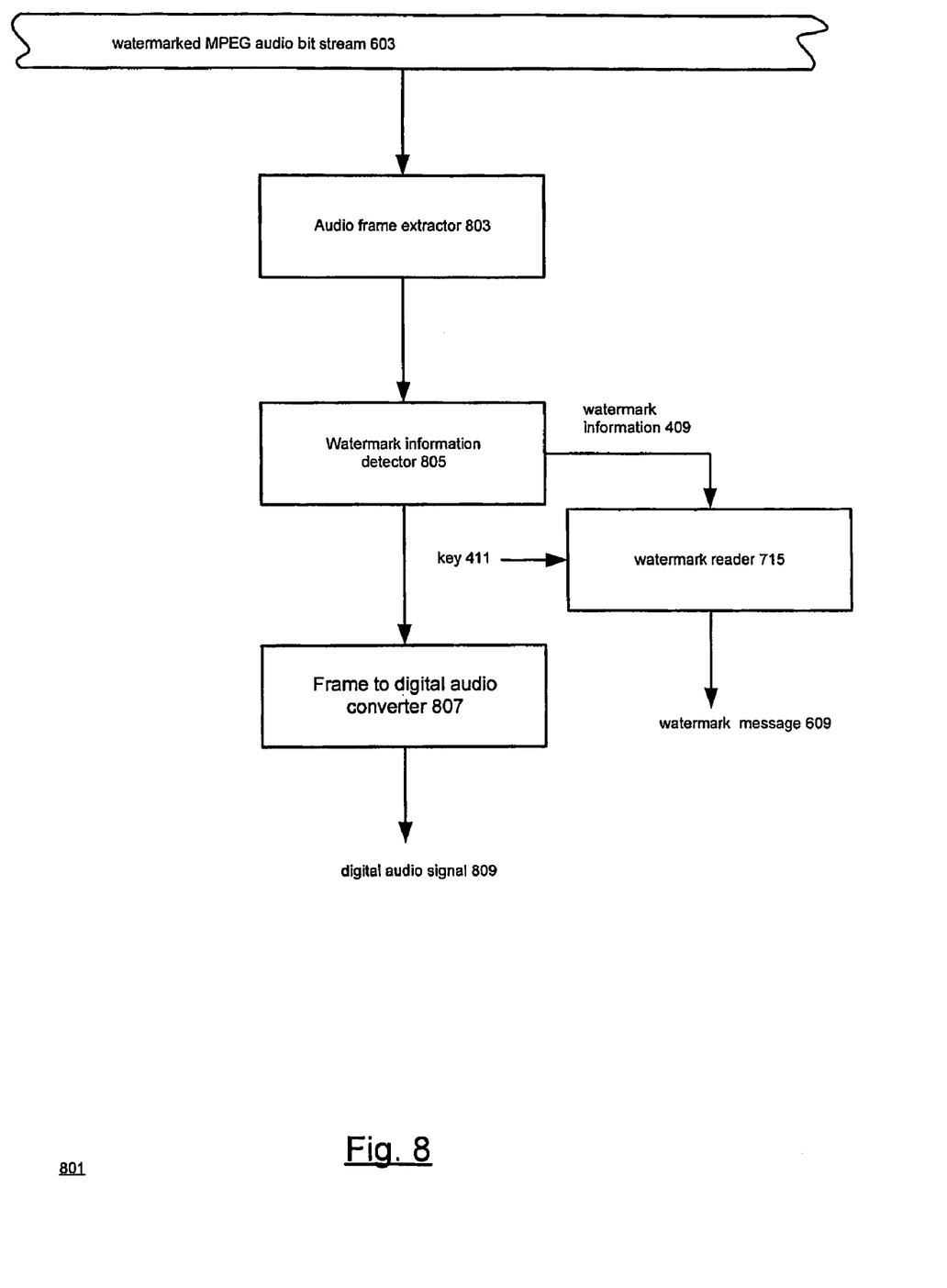
FIG. 8 is a block diagram of apparatus to detect watermarks in frames made using the technique of FIG. 4.

An MPEG Audio Decoder that Detects Watermark Information 409: FIG. 8

FIG. 8 is a block diagram of an MPEG audio decoder 801 that detects watermark information 409 in a watermarked MPEG audio bit stream 603. As with any MPEG audio decoder, the first step is to extract the audio frames from MPEG audio bit stream 603. This is done by audio frame extractor 803. The extracted frame goes to watermark information detector 805, which uses the technique shown in FIG. 7 to extract watermark information 409 from the frame. Watermark information 409 goes to watermark reader 715, and as described above, watermark reader 715 uses key 411 to read watermark message 609 from watermark information 409. The processing of FIG. 7 does not alter the extracted frame, which then goes to frame to digital audio converter 807, where it is converted to a digital audio signal 809. Of course, the technique of FIG. 8 can be applied simply to read the watermark, without producing a digital audio signal, and can be done on an MPEG file as well as on an MPEG stream. Since watermark reading by itself does not involve the real time constraints of producing a digital audio signal, a simple watermark reader will require far fewer computation resources than an equivalent device in MPEG audio decoder 801.

An Application of the Technique

The emergence of the DVD as the vehicle of choice for copies of movies, combined with the fact that any computer can make a perfect copy of the digital representation of the movie that is contained on the DVD, has greatly increased the incidence and profitability of pirating movies. For example, DVDs of movies made for reviewing purposes prior to the movie's theatrical release often fall into the hands of pirates, and when this happens, bootleg DVDs of a movie may be available even before the movie appears in the theaters. One way of discouraging the employees of the movie companies or the reviewers from intentionally or negligently permitting these review DVDs to fall into the hands of pirates is to use the techniques just described to watermark the digital representation on each DVD using an ID number as the watermark message. If the movie company keeps track of the employees and reviewer who had access to a DVD with a given ID number, an employee or reviewer permits the DVD to fall into the hands of a pirate, and the pirate cannot detect or remove the watermark, the copies made by the pirate will contain the watermark. When the watermark message is read from a pirated copy, the ID number specified by the message will make it clear which of the review copies was the source of the pirated copy. Where employees are involved, the movie company can use its own internal disciplinary procedures to deal with them; where reviewers are involved, the movie company can bar the reviewer from receiving further review DVDs.

The type of watermark application just described is termed a forensic application, since it provides information that may be useful in solving a crime. Watermarks made according to the techniques described herein are particularly useful for forensic applications because the manner in which the watermark bits are spread across the frame makes it hard for a pirate to read or remove them, while the movie company, which has access to the key used to randomize and derandomize the time domain transformations and knows which frequency carries the watermark bit, can read the watermark bits relatively easily. The use of error correction bits with the watermark value and the sync words, together with the high number of repetitions of the watermark value and sync words, further enormously increase the probability that the DVD's ID number will be readable from the pirated copy. Because there are no real time constraints in a forensic application, comparatively few computational and memory resources are required to read the watermark message.

CONCLUSION

The foregoing Detailed Description has described to those knowledgeable in the relevant technologies how to implement and use the watermarking techniques disclosed herein and has also described the best mode presently known to the inventors of implementing their watermarking techniques. It will be immediately apparent to those knowledgeable in the relevant technologies that Applicants' techniques are very general. Some examples of their generality are the following: the watermark information may be added to the digital representation using any reversible transformation which has the effect of spreading the watermark information across the watermarked digital representation. One set of transformations which can be used to spread the watermark information are those between the space or time domain on one hand and the frequency domain on the other. In the implementation of the techniques for the MPEG audio stream, the original digital representation is in the frequency domain, but the techniques may also be employed when the original digital representation is in the time or space domain. Because the techniques work in both the space and time domains, it may be used not only to watermark digital representations of audio signals, but also digital representations of images or video.

The fact that the techniques spread the watermark information across the watermarked digital representation, taken with the fact that the techniques can be used to add the watermark in the course of a lossy compression process, means that the techniques are compatible with any perception model, or indeed with any arrangement in which the watermarked digital representation is tailored to meet certain requirements as it is produced.

Because the techniques are so general and have so many potential applications, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method of making a watermarked digital representation of a signal from an original digital representation thereof, the method comprising the steps of:
   making a first transformation of the original digital representation to produce a first intermediate digital representation;
   adding watermark information to the first intermediate digital representation; and
   reversing the first transformation, the first transformation having the property that making and reversing the transformation spreads the watermark information across the original digital representation;
   wherein:
   the original digital representation and the watermarked digital representation belong to a first domain which is either the time/space domain or the frequency domain; and
   the step of making the first transformation includes the step of making a second transformation into a second domain which is the opposite of the first domain and the step of reversing the first transformation includes the step of making a third transformation into the second domain.

2. The method set forth in claim 1 wherein:
   in the step of making the first transformation, the step of making the second transformation further includes the steps of
   randomizing the second transformation and
   obtaining the first transformation by transforming the randomized second transformation into the first domain; and
   in the step of reversing the first transformation, the, step of making the third transformation includes the steps of
   obtaining the third transformation by transforming the watermarked first transformation into the second domain;
   derandomizing the third transformation; and
   obtaining the watermarked digital representation by transforming the derandomized third transformation into the first domain.

3. The method set forth in claim 2 wherein:
   in the steps of randomizing and derandomizing, the randomizing and derandomizing is done using a key.

4. The method set forth in claim 1 wherein the original digital representation has been made according to a perception model and the method further comprises the step of:
   filtering the watermarked digital representation according to the perception model.

5. The method set forth in claim 4 further comprising the steps of:
   determining whether the watermarked digital representation conforms to a quality and bitrate standard; and
   when the watermarked digital representation does not conform, modifying the watermarked digital representation according to the perception model.

6. The method set forth in claim 1 wherein:
   the steps of the method are performed when the original digital representation is made from a received digital representation.

7. A method of detecting watermark information in a watermarked digital representation of a signal, the watermarked digital representation having been made from an original digital representation of the signal by making a first transformation of the original digital representation to produce a first intermediate digital representation, adding the watermark information to the first intermediate digital representation, and making the watermarked digital representation from the watermarked first intermediate digital representation by reversing the first transformation and the method comprising the steps of:
   repeating the first transformation on the watermarked digital representation to produce a second intermediate representation; and
   determining whether the second intermediate digital representation contains the watermark information;
   wherein:
   the original digital representation and the watermarked digital representation belong to a first domain which is either the time/space domain or the frequency domain; and
   the step of making the first transformation includes the step of making a second transformation into a second domain which is the opposite of the first domain and
   the step of reversing the first transformation includes the step of making a third transformation into the second domain.

8. A method of adding watermark information to a MPEG audio frame the method being performed after the raw samples for the MPEG audio frame have been submitted to quantization according to an audio perception model to produce the MPEG audio frame and before the MPEG audio frame is tested for conformance to a predetermined bit rate and quality and the method comprising the steps of:
- receiving the watermark information; and
- adding the watermark information to the MPEG audio frame;

wherein:
- the step of adding the watermark information to the MPEG audio frame further spreads the watermark information across the watermarked MPEG audio frame;

wherein:
- the step of adding the watermark information to the MPEG audio frame further comprises the steps of:
  - making a transformed frame that is a reversible transformation of the MPEG audio frame;
  - adding the watermark information to the transformed frame; and
  - making the watermarked MPEG audio frame by reversing the transformation of the watermarked transformed frame,
  - the transformation and reversal thereof operating to spread the watermark information across the watermarked MPEG audio frame; and wherein:
- the step of making the transformed frame further comprises the steps of making a first transformation of the MPEG audio frame to the time domain;
- randomizing the first transformation; and
- making a second transformation of the randomized first transformation to the frequency domain; and
- the step of reversing the transformation of the watermarked transformed frame further comprises the steps of
  - making a third transformation of the watermarked second transformation to the time domain;
  - derandomizing the third transformation; and
  - making a fourth transformation of the derandomized third transformation to the frequency domain.

9. The method set forth in claim 8 further comprising the step performed when a watermarked MPEG audio frame does not conform to the predetermined bit rate and quality of:
- submitting the watermarked MPEG audio frame to bit/noise allocation and quantization.

10. The method set forth in claim 8 further comprising the step of:
- filtering the watermarked MPEG audio frame with a filter based on the audio perception model.

11. The method set forth in claim 8 further comprising the step performed when a watermarked MPEG audio frame does not conform to the predetermined bit rate and quality of:
- submitting the watermarked MPEG audio frame to bit/noise allocation and quantization.

12. The method set forth in claim 8 further comprising the step of:
- filtering the watermarked MPEG audio frame with a filter based on the audio perception model.

13. The method set forth in claim 8 further comprising the step performed when a watermarked MPEG audio frame does not conform to the predetermined bit rate and quality of:
- submitting the watermarked MPEG audio frame to bit/noise allocation and quantization.

14. The method set forth in claim 8 further comprising the step of:
- filtering the watermarked MPEG audio frame with a filter based on the audio perception model.

15. The method set forth in claim 8 wherein:
- the step of adding the watermark information to the transformed frame comprises the step of:
- adding a predetermined frequency to the second transformation.

16. The method set forth in claim 15 wherein:
- the predetermined frequency represents a bit of the watermark information.

17. The method set forth in claim 8 wherein:
- in the steps of randomizing the first transformation and derandomizing the third transformation, the randomizing and derandomizing are done using a key.

18. A method of detecting watermark information in a MPEG frame, the watermark information having been added to the MPEG audio frame by making a transformed frame by applying a reversible transform to the MPEG audio frame, adding the watermark information to the transformed frame, and making the watermarked MPEG audio frame by applying a reversible transformation to the watermarked transformed frame, and the method comprising the steps of:
- applying the reversible transform to the watermarked MPEG audio frame; and
- determining whether the frame resulting therefrom contains watermark information;

wherein:
- the original digital representation and the watermarked digital representation belong to a first domain which is either the time/space domain or the frequency domain; and
- the step of making the first transformation includes the step of making a second transformation into a second domain which is the opposite of the first domain and
- the step of reversing the first transformation includes the step of making a third transformation into the second domain.

19. A method of adding watermark information to a MPEG audio frame comprising the steps of:
- making a transformed frame that is a reversible transformation of the MPEG audio frame;
- adding the watermark information to the transformed frame; and
- making a watermarked MPEG audio frame by reversing the transformation of the watermarked transformed frame, the transformation and reversal thereof operating to spread the watermark information across the watermarked MPEG audio frame;

wherein:
- the original digital representation and the watermarked digital representation belong to a first domain which is either the time/space domain or the frequency domain; and
- the step of making the first transformation includes the step of making a second transformation into a second domain which is the opposite of the first domain and
- the step of reversing the first transformation includes the step of making a third transformation into the second domain.

20. An MPEG audio encoder of the type that includes at least a quantizer that produces an MPEG audio frame according to an audio perception model from raw samples for the frame and a quality checker that receives the MPEG audio frame from the quantizer, determines the quality and bitrate of the MPEG audio frame, and returns the MPEG audio frame to the quantizer if the quality or bitrate is insufficient, the MPEG audio encoder comprising:

a watermarked frame maker that receives a MPEG audio frame from the quantizer, adds watermark information to the MPEG audio frame, and provides the watermarked MPEG audio frame to the quality checker; wherein the watermarked frame maker receives the watermark information; and adds the watermark information to the MPEG audio frame; wherein:

the step of adding the watermark information to the MPEG audio frame further spreads the watermark information across the watermarked MPEG audio frame;

wherein:

the step of adding the watermark information to the MPEG audio frame further comprises the steps of:

making a transformed frame that is a reversible transformation of the MPEG audio frame;

adding the watermark information to the transformed frame; and making the watermarked MPEG audio frame by reversing the transformation of the watermarked transformed frame, the transformation and reversal thereof operating to spread the watermark information across the watermarked MPEG audio frame; and wherein:

the step of making the transformed frame further comprises the steps of making a first transformation of the MPEG audio frame to the time domain;

randomizing the first transformation; and making a second transformation of the randomized first transformation to the frequency domain; and the step of reversing the transformation of the watermarked transformed frame further comprises the steps of making a third transformation of the watermarked second transformation to the time domain;

derandomizing the third transformation; and making a fourth transformation of the derandomized third transformation to the frequency domain.

21. An MPEG audio decoder of the type that receives a MPEG audio frame and produces digital audio output therefrom, the MPEG audio decoder comprising:

a watermark information detector that detects watermark information in the MPEG audio frame, the watermark information having been added to the MPEG audio frame by making a transformed frame by applying a reversible transform to the MPEG audio frame, adding the watermark information to the transformed frame, and making the watermarked MPEG audio frame by applying the reverse of the reversible transform to the watermarked transformed frame, and the watermark detector detecting the watermark information by applying the reversible transform to the watermarked MPEG audio frame and determining whether the frame resulting therefrom contains watermark information;

wherein:

the original digital representation and the watermarked digital representation belong to a first domain which is either the time/space domain or the frequency domain; and the step of making the first transformation includes the step of making a second transformation into a second domain which is the opposite of the first domain and the step of reversing the first transformation includes the step of making a third transformation into the second domain.

22. Apparatus for reading watermark information from a MPEG audio frame comprising:

a watermark information detector that detects watermark information in the MPEG audio frame, the watermark information having been added to the MPEG audio frame by making a transformed frame by applying a reversible transform to the MPEG audio frame, adding the watermark information to the transformed frame, and making the watermarked MPEG audio frame by applying the reverse of the reversible transform to the watermarked transformed frame, and the watermark detector detecting the watermark information by applying the reversible transform to the watermarked MPEG audio frame and determining whether the frame resulting therefrom contains watermark information; and a watermark reader that receives the watermark information from the watermark information detector and reads a watermark message from the watermark information;

wherein:

the original digital representation and the watermarked digital representation belong to a first domain which is either the time/space domain or the frequency domain; and the step of making the first transformation includes the step of making a second transformation into a second domain which is the opposite of the first domain and the step of reversing the first transformation includes the step of making a third transformation into the second domain.

* * * * *